(12) United States Patent
Choi et al.

(10) Patent No.: US 11,634,852 B2
(45) Date of Patent: Apr. 25, 2023

(54) DETERGENT SUPPLY DEVICE AND WASHING MACHINE INCLUDING THE SAME

(71) Applicant: Samsung Electronics Co., Ltd., Suwon-si (KR)

(72) Inventors: Wonseok Choi, Suwon-si (KR); Jindoo Kim, Suwon-si (KR); Bongjin Ko, Suwon-si (KR); Byeongwoo Kim, Suwon-si (KR); Byengbae Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 206 days.

(21) Appl. No.: 17/113,221

(22) Filed: Dec. 7, 2020

(65) Prior Publication Data

US 2021/0172108 A1 Jun. 10, 2021

(30) Foreign Application Priority Data

Dec. 6, 2019 (KR) .......................... 10-2019-0161874

(51) Int. Cl.
*D06F 39/02* (2006.01)
*F16K 1/42* (2006.01)

(52) U.S. Cl.
CPC .............. *D06F 39/022* (2013.01); *F16K 1/42* (2013.01)

(58) Field of Classification Search
CPC . D06F 39/022; F16K 1/42; F16K 1/36; F16K 1/427; F16K 1/46; F16K 15/063; F16K 15/025; F16K 27/0209; F16K 27/08
See application file for complete search history.

(56) References Cited

U.S. PATENT DOCUMENTS

| | | | | |
|---|---|---|---|---|
| 2,578,994 A * | 12/1951 | Dunaway | ............... | D06F 39/022 222/428 |
| 4,862,913 A * | 9/1989 | Wildfang | ............... | F16K 15/063 137/543 |
| 5,240,036 A * | 8/1993 | Morris | ................... | F16K 15/063 137/514.7 |
| 2005/0279413 A1* | 12/2005 | Shen | ..................... | F16K 15/063 137/554 |
| 2009/0183782 A1* | 7/2009 | Martin | ................... | F16K 15/063 137/244 |
| 2015/0362085 A1* | 12/2015 | Hu | ........................ | F16K 15/063 137/543.15 |

FOREIGN PATENT DOCUMENTS

| | | |
|---|---|---|
| KR | 10-0698132 | 3/2007 |
| KR | 10-0857802 | 9/2008 |
| KR | 10-2017-0096314 | 8/2017 |
| WO | WO-2020078772 A1 * | 4/2020 ........... F16K 15/063 |

* cited by examiner

*Primary Examiner* — Patrick C Williams
(74) *Attorney, Agent, or Firm* — Staas & Halsey LLP

(57) ABSTRACT

A washing machine has a structure to facilitate the supply of a liquid detergent. A detergent supply device of the washing machine includes a valve housing in communication with a detergent container, a valve housing cap coupled to the valve housing and provided with an opening, a plunger configured to pass through the opening and disposed inside the valve housing to be guided by the valve housing cap, and a sealing configured to surround a circumference of the plunger to selectively open and close the opening according to the movement of the plunger.

20 Claims, 11 Drawing Sheets

DETERGENT SUPPLY DEVICE AND WASHING MACHINE INCLUDING THE SAME

CROSS-REFERENCE TO RELATED APPLICATION(S)

This application is based on and claims priority under 35 U.S.C. § 119 to Korean Patent Application No. 10-2019-0161874, filed on Dec. 6, 2019, in the Korean Intellectual Property Office, the disclosure of which is incorporated by reference herein in its entirety.

BACKGROUND

1. Field

The disclosure relates to a washing machine, more particularly, providing a detergent supply device including a detergent flow check valve for controlling the flow of detergent during the separation and mounting of a detergent supply device.

2. Description of the Related Art

In general, a washing machine is an apparatus that performs washing of laundry through mutual friction by stirring together laundry, washing water, and detergent accommodated in a washing tub using a driving force of a motor. The detergent supply device is a device that evenly mixes a detergent into water in the process of supplying water into a water tub and then supplies the detergent mixed with water to the water tub. Or, unlike the above, the detergent supply device is a device that directly supplies a liquid detergent into a water tub.

The washing machine includes a box-shaped housing having an open front side and mounted on an upper front side of a main body, and a detergent container holder that is mounted by entering the housing through the open front side of the housing and detachable in the form of a drawer.

Recently, washing machines equipped with liquid detergent supply devices in which a detergent receiving space for liquid detergent is formed in a detergent container are used to use liquid detergents such as a rinsing agent and a bleaching agent, and a separate detergent pump may be provided in order to introduce a detergent into a water tub.

A detergent flow check valve for controlling the flow of detergent may be provided between the detergent supply device and the detergent pump described above. However, the detergent flow check valve may block a path through which the detergent flows due to a seal being removed from the fixed position or deformed by a suction force of the detergent pump.

SUMMARY

It is an aspect of the disclosure to provide a washing machine having an improved structure to facilitate the supply of a liquid detergent.

It is another aspect of the disclosure to provide a washing machine having an improved structure so that when a detergent supply device is separated from the washing machine, a detergent flows out and spoils the appearance or does not require frequent cleaning and repair.

It is another aspect of the disclosure to provide a washing machine having an improved structure to prevent deformation of a seal of a detergent flow check valve of a detergent supply device and malfunction of the detergent supply device.

Additional aspects of the disclosure will be set forth in part in the description which follows and, in part, will be obvious from the description, or may be learned by practice of the disclosure.

In accordance with an aspect of the disclosure, a detergent supply device of a washing machine includes a valve housing in communication with a detergent container, a valve housing cap coupled to the valve housing and provided with an opening, a plunger configured to pass through the opening and disposed inside the valve housing to be guided by the valve housing cap, and a sealing configured to surround a circumference of the plunger to selectively open and close the opening according to the movement of the plunger.

The valve housing cap may include a plunger guide protruding from the opening toward the inside of the valve housing.

The plunger may include a first slider configured to be supported by the valve housing, an intermediate plate combined with the first slider, and a second slider extending from the intermediate plate toward the opening along a circumference of the intermediate plate.

The valve housing may include a valve housing rib protruding from an inner surface of the valve housing toward the inside of the valve housing to support the first slider.

The first slider may be formed in a bar shape to be supported by the valve housing rib, and a diameter of the first slider may be provided smaller than a diameter of the intermediate plate.

A diameter of the second slider may be provided smaller than a diameter of the opening, and the second slider may include a flange supported by the valve housing cap and configured to slide along the valve housing cap according to the movement of the plunger, and a sealing seating groove provided between the intermediate plate and the flange.

The flange may include a detergent flow groove to guide the flow of a detergent.

The plunger may be configured such that the flange protrudes from the valve housing cap, and the flange may be configured to be always supported by the valve housing cap even when the plunger slides into the valve housing.

The sealing may be formed in a ring shape, and may include a first sealing portion having a constant width and a second sealing portion positioned outside the first sealing portion and having a width gradually decreasing as a distance from the center of the sealing increases.

The second sealing portion may be formed in either a straight line or a curved line.

The second sealing portion may be provided to be symmetrical.

The first sealing portion may be configured to be inserted into the sealing seating groove, and the sealing may be configured such that a height of a portion in contact with the opening is in a ratio of 0.4 to 0.6 compared to a thickness of the sealing in a radial direction.

The plunger may be configured such that a pressing part outside the detergent supply device presses the intermediate plate of the plunger, and may further include a pressing part guide protruding from the center of the intermediate plate toward the opening.

The detergent supply device may further include a spring configured to surround the first slider and disposed between the valve housing rib and the intermediate plate.

The detergent supply device may further include a cover sealing configured to surround the valve housing and a connection portion between the valve housing and the valve housing cap.

In accordance with another aspect of the disclosure, a detergent supply device of a washing machine includes a valve housing having one side in communication with a detergent container, a plunger guide provided on the other side of the valve housing and forming an opening, a plunger disposed inside the valve housing to be supported by the plunger guide, and a sealing located in the valve housing, disposed in a sealing seating groove formed on a circumference of plunger to surround the circumference of the plunger, and configured to selectively open and close the opening according to the movement of the plunger.

The plunger may include a sliding bar configured to be supported by a valve housing rib protruding from an inner side surface of the valve housing toward the inside of the valve housing, an intermediate plate combined with the sliding bar, and a flange extending from the intermediate plate toward the opening, and the sealing seating groove may be disposed between the flange and the intermediate plate.

The plunger may be configured such that the flange protrudes from the opening, and the flange may be configured to be always supported by the plunger guide even when the plunger slides into the valve housing.

The sealing may be formed in a ring shape, and may include a first sealing portion having a constant width and a second sealing portion positioned outside the first sealing portion and having a width gradually decreasing as a distance from the center of the sealing increases.

The second sealing portion may be formed in either a straight line or a curved line and provided to be symmetrical.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations shown in the embodiments and the drawings described in the present specification are only the preferred embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

The terms "front and rear directions," "up and down directions," "upper portion," "lower portion," etc., used in the following description are defined with reference to the drawings, and the shape and position of each component are not limited by these terms.

Figure 1:
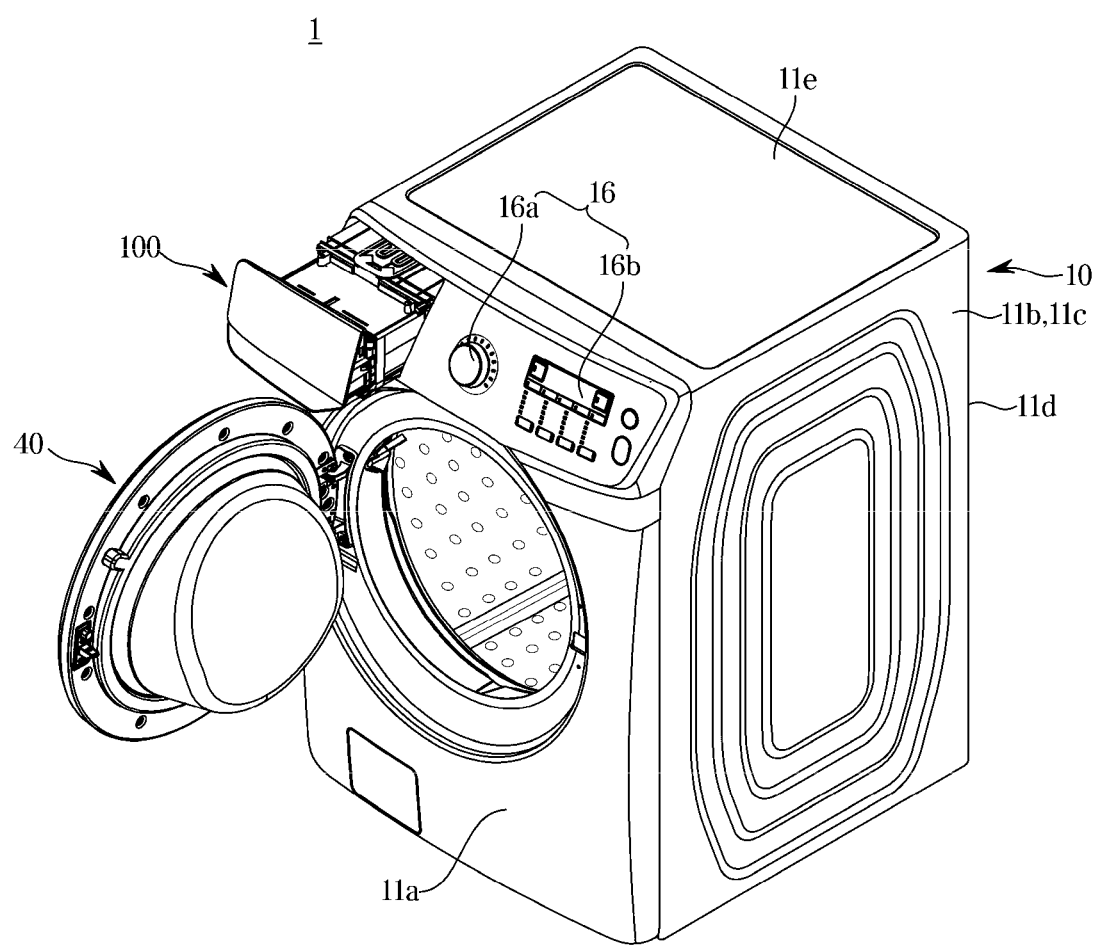
FIG. 1 is a perspective view of a washing machine according to an embodiment of the disclosure, illustrating a state in which a detergent supply device is withdrawn.

Specifically, as illustrated in FIG. 1, a direction in which a detergent supply device 100 is withdrawn from a washing machine 1 will be defined as the front, and the rear, left and right sides, and upper and lower sides will be defined based on the direction.

Hereinafter, embodiments of the disclosure will be described in detail with reference to the accompanying drawings.

Hereinafter, the washing machine 1 and the detergent supply device 100 will be schematically described with reference to FIGS. 1 to 2. FIG. 1 is a perspective view of a washing machine according to an embodiment of the disclosure, illustrating a state in which the detergent supply device 100 is withdrawn, and FIG. 2 is a cross-sectional view of the washing machine according to an embodiment of the disclosure.

Figure 2:
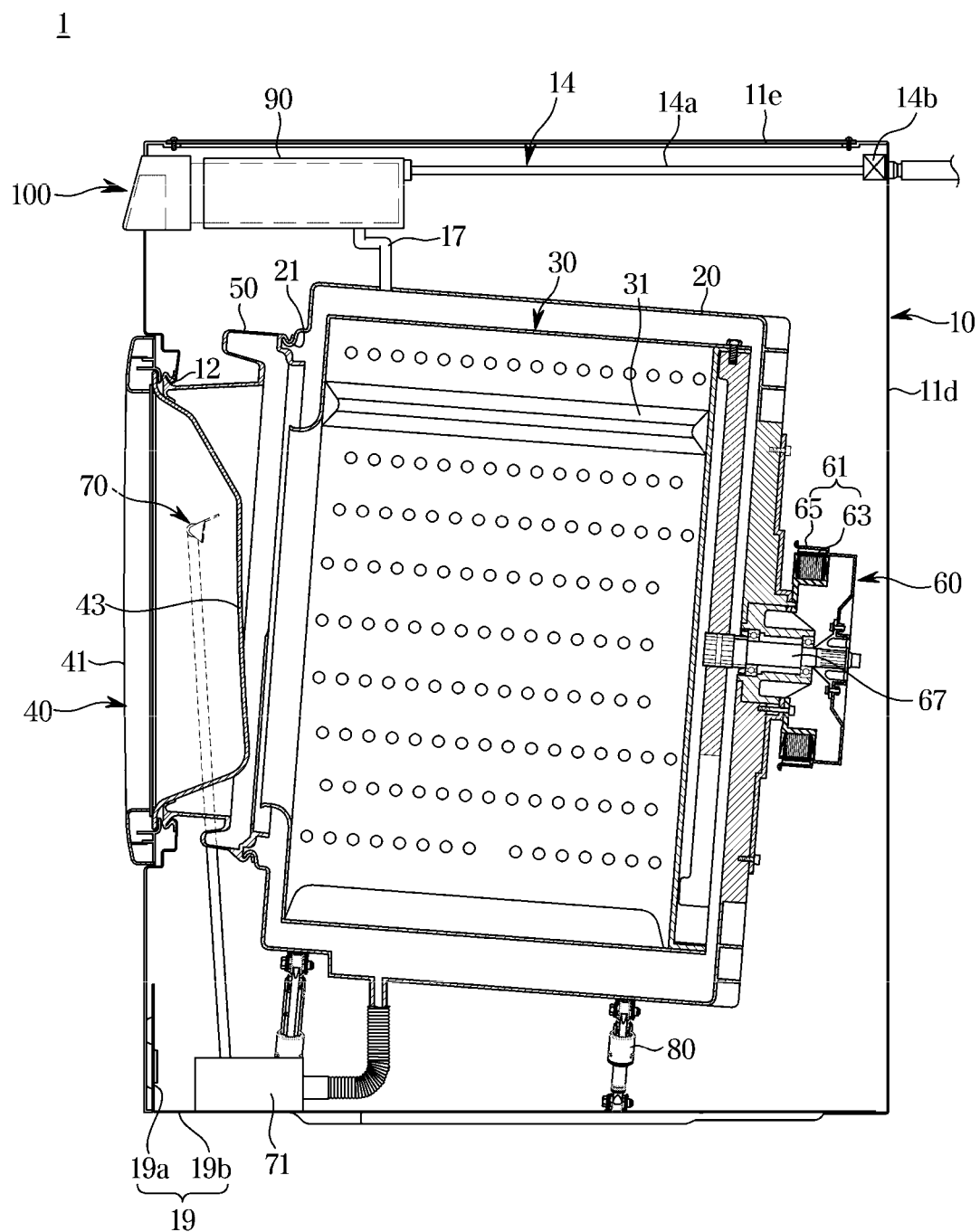
FIG. 2 is a cross-sectional view of the washing machine according to an embodiment of the disclosure.

The washing machine 1 illustrated in FIGS. 1 to 2 includes a cabinet 10 forming an outer appearance and accommodating various components therein, a tub 20 disposed inside the cabinet 10 to store a mixed water in which washing water and detergent are mixed, a drum 30 rotatably disposed inside the tub 20 to accommodate laundry, and a driving device 60 configured to rotate the drum 30.

The cabinet 10 may be formed in a substantially hexahedral shape. The cabinet 10 may be formed in a box shape having an open front side. The cabinet 10 may include a rear plate 11d and opposite side plates 11b and 11c disposed on one side and the other side in front of the rear plate 11d. An embodiment of the disclosure illustrates that the rear panel and opposite side plates of the cabinet are integrally formed as an example, but the disclosure is not limited thereto. The cabinet 10 may include a front panel 11a provided on the open front side, a base 19 provided on a bottom, and a top cover 11e provided on an upper side.

A control panel 16 including an input 16a receiving an operation command from a user and a display 16b displaying operation information of the washing machine 1 may be provided on a front side of the cabinet 10.

The base 19 may include a lower frame 19b covering a lower portion of the cabinet 10 and a lower reinforcing frame 19a extending from the lower frame 19b.

An opening 13 may be formed on the front panel 11a to allow laundry to be put into the drum 30. Openings are formed on the tub 20 and the drum 30 so that laundry may be put in or taken out from the front of the cabinet 10, and the openings of the tub 20 and the drum 30 may be positioned to correspond to the opening 12 of the front panel 11a.

The opening 12 provided on the front panel 11a may be opened and closed by a door 40. The door 40 may be rotatably mounted on the front panel 11a of the cabinet 10 by a hinge member (not shown). The door 40 may include a door frame 41 and a door glass 43. The door glass 43 may be formed of a transparent tempered glass material so that the inside of the cabinet 10 may be seen through.

A water supply valve 14b and a water supply pipe 14a for controlling water supply, and the detergent supply device 100 for supplying a detergent into the tub 20 during a water supply process may be installed above the tub 20.

The detergent supply device 100 may be connected to the tub 20 through a water supply pipe 17. Washing water supplied through the water supply pipe 14a is mixed with the detergent via the detergent supply device 100, and the mixed water in which the washing water and the detergent are mixed may be supplied into the tub 20. Or, unlike the above, washing water supplied through the water supply pipe 14a is supplied directly into the tub 20 through a separate control valve (not shown), a liquid detergent may be supplied into the tub 20 through a detergent supply pipe (not shown) after passing through the detergent supply device 100 and a detergent pump unit 900.

The driving device 60 may be provided at the rear of the drum 30. The driving device 60 for rotating the drum 30 may be configured to transmit a driving force generated by a motor 61 to a rotating shaft 67 to rotate the drum 30.

The motor 61 may include a fixed stator 63 and a rotor 65 rotating by electromagnetically interacting with the stator 63 to convert an electric force into a mechanical rotating force.

The tub 20 stores mixed water in which washing water and detergent are mixed, and may be formed in a substantially cylindrical shape. The tub 20 may be fixed inside the cabinet 10. The opening 12 on the front panel 11a and the tub 20 may be connected by a diaphragm 50.

One side of the diaphragm 50 may be provided with a spray nozzle 70 connected to a circulation hose to spray the mixed water which is circulated, into the drum 30. The spray nozzle 70 is configured to spray the mixed water evenly over the entire laundry accommodated in the drum 30. The circulation hose may be connected to a circulation pump 71 configured to pump the mixed water stored in a lower portion of the tub 20.

The drum 30 may perform washing by lifting and falling laundry while rotating inside the tub 20. A plurality of lifters 31 may be provided on an inner surface of the drum 30.

A drainage device (not shown) including a drain pipe (not shown), a drain valve (not shown), and the like for draining water inside the tub 20 may be installed below the tub 20.

The tub 20 is provided to be elastically supported on the cabinet 10 by an upper spring (not shown) and a lower damper 80. That is, when the vibration generated when the drum 30 rotates is transmitted to the tub 20 and the cabinet 10, the spring and the damper 80 are provided to attenuate the vibration that is transmitted to a main body by absorbing vibration energy between the tub 20 and the cabinet 10.

Figure 3:
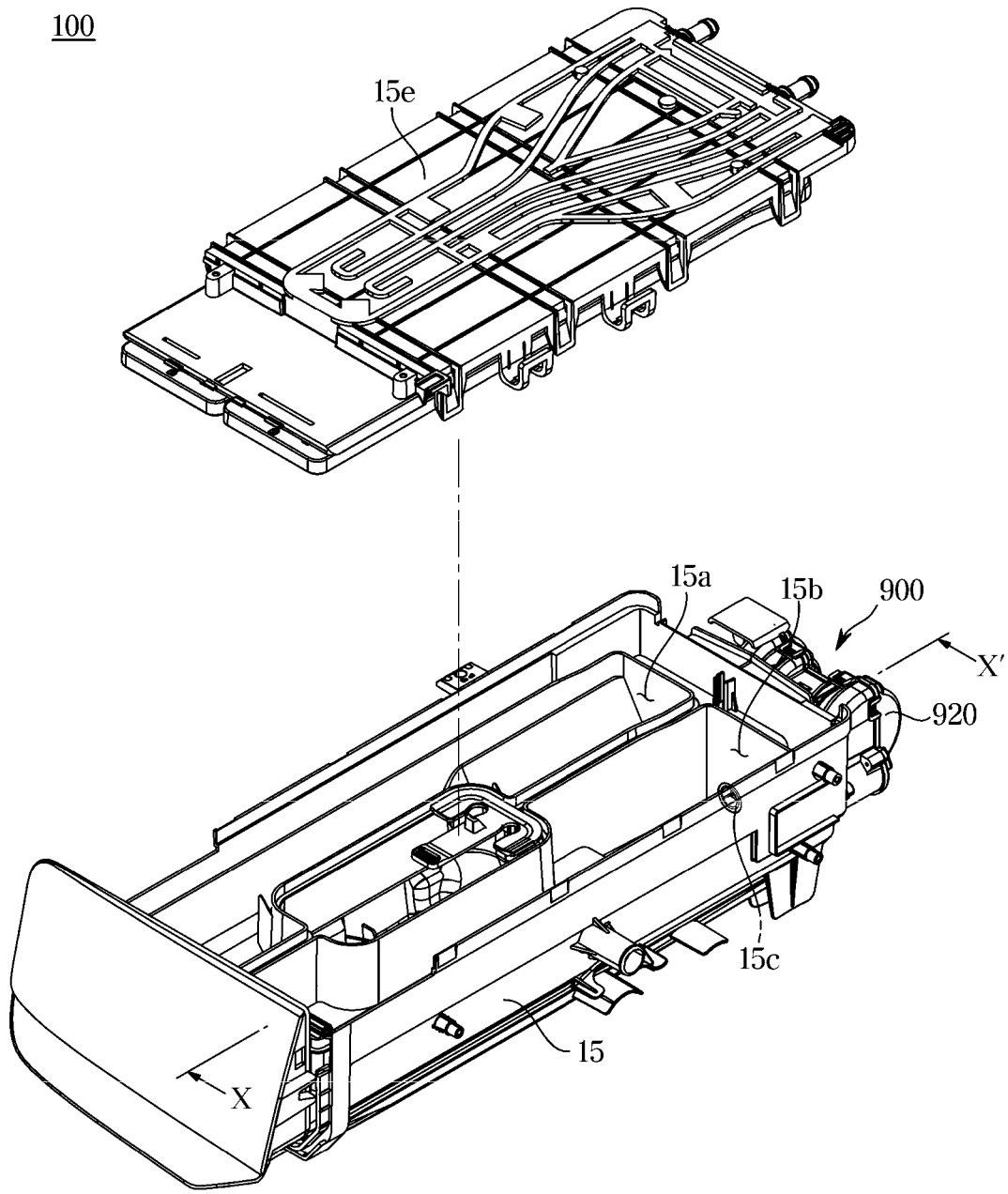
FIG. 3 is a view illustrating a detergent container holder, a detergent container, a detergent pump unit, and a detergent outlet formed in the detergent container in a state in which a detergent supply device cover of the washing machine according to an embodiment of the disclosure is opened.
Figure 4:
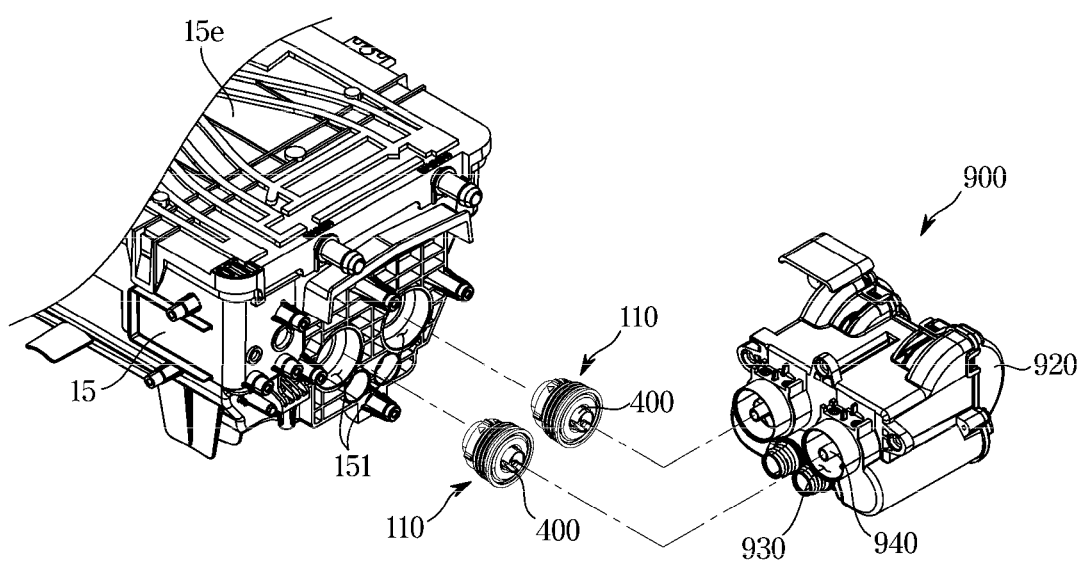
FIG. 4 is a view illustrating an arrangement relationship between the detergent supply device and the detergent pump unit in the washing machine according to an embodiment of the disclosure.

Hereinafter, the detergent supply device 100 and the detergent pump unit 900 will be schematically described with reference to FIGS. 3 to 4. FIG. 3 is a view illustrating a detergent container holder 15, detergent containers 15a and 15b, the detergent pump unit 900, and a detergent outlet 15c formed in the detergent containers 15a and 15b in a state in which a detergent supply device cover 15e of the washing machine 1 according to an embodiment of the disclosure is opened, and FIG. 4 is a view illustrating an arrangement relationship between the detergent supply device 100 and the detergent pump unit 900 in the washing machine 1 according to an embodiment of the disclosure.

The washing machine 1 may be provided with the detergent supply device 100 for supplying a detergent into the tub 20.

As illustrated in FIG. 3, the detergent supply device 100 may include the detergent supply device cover 15e and the detergent container holder 15. The detergent containers 15a and 15b may be mounted inside the detergent container holder 15. A plurality of the detergent containers 15a and 15b may be provided as illustrated in FIG. 3. That is, the plurality of detergent containers 15a and 15b may be provided to separately supply detergents depending on the type of detergent. The number of the detergent containers 15a and 15b illustrated in FIG. 3 is two, but three or more detergent containers may be provided depending on the type of detergent.

The detergent supply device cover 15e may be configured to cover an upper portion of the detergent supply device 100 after the detergent containers 15a and 15b are seated in the detergent container holder 15.

An opening 151 may be formed at the rear of the detergent container holder 15 so that the detergent containers 15a and 15b and the detergent pump unit 900 are be in communication with each other. The detergent outlet 15c (refer to FIG. 3) may be provided at the rear of the detergent containers 15a and 15b, and when the detergent containers 15a and 15b are seated in the detergent container holder 15, the opening 151 formed on the detergent container holder 15 and the detergent outlet 15c may be positioned to correspond to each other. A detergent flow check valve 110 may be connected to the detergent containers 15a and 15b through the opening 151 formed on the detergent container holder 15.

A detailed structure in which the detergent flow check valve 110 is combined with the detergent containers 15a and 15b through the opening 151 formed on the detergent container holder 15 is as follows. A detergent container connection portion 15d (see FIG. 6) may be formed at the detergent outlet 15c of the detergent containers 15a and 15b. A valve housing connection portion 200a (see FIG. 6) may be formed at the detergent flow check valve 110. The detergent container connection portion 15*d* may be provided in the form of male threads, and the valve housing connection portion 200*a* may be provided in the form of female threads. After the detergent containers 15*a* and 15*b* are seated in the detergent container holder 15, the opening 151 formed on the detergent container holder 15 and the detergent outlet 15*c* may be positioned to correspond to each other. The male threads of the detergent outlet 15*c* of the detergent containers 15*a* and 15*b* exposed through the opening 151 and the female threads of the detergent container connection portion 15*d* may be combined by rotation.

The washing machine 1 may include a housing 90 to mount the detergent supply device 100. The housing 90 is disposed above the tub 20 and may be fixed to the washing machine 1. The housing 90 is mounted on an upper part of the main body of the washing machine 1 and may be provided in a box shape having an open front side. The detergent supply device 100 may be mounted by entering the inside of the housing 90 through the open front side of the housing 90. In other words, the detergent supply device 100 may be provided in the form of a drawer and may be mounted in or separated from the housing 90 through the open front side of the housing 90.

The detergent pump unit 900 may be disposed inside the housing 90. The detergent pump unit 900 may include a detergent pump housing 920 and a detergent pump 910. The detergent pump housing 920 may include a seating part 930 so that the detergent flow check valve 110 of the detergent supply device 100 is seated when the detergent supply device 100 is mounted inside the housing 90. The seating part 930 may be provided with a pressing part 940 to press a plunger 400 of the detergent flow check valve 110 of the detergent supply device 100. Specifically, the pressing part 940 may be provided to press an intermediate plate 420 of the plunger 400. The pressing part 940 may be formed in the shape of a hollow circular cylinder. As the pressing part 940 is formed in the shape of a hollow circular cylinder, a pressing part guide 430 formed on the intermediate plate 420 of the plunger 400 may be inserted into the pressing part 940. Through this structure, when mounting of the detergent supply device 100 into the housing 90 is completed, the pressing part 940 may more stably press the plunger 400 of the detergent flow check valve 110.

After the detergent supply device 100 is mounted in the housing 90, the detergent pump 910 may be operated according to a washing mode input by a user through the control panel 16. The detergent in the detergent supply device 100 may be introduced into the tub 20 by the operation of the detergent pump 910.

Figure 5:
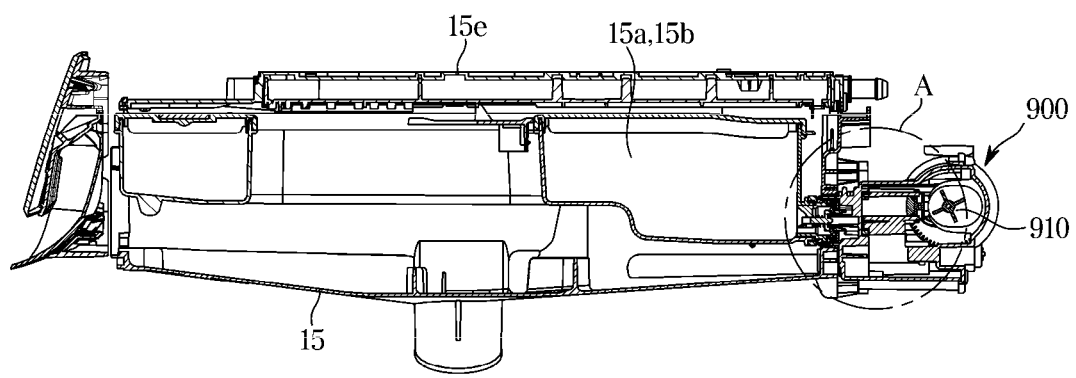
FIG. 5 is a cross-sectional view taken along line X-X' in FIG. 3 in a state in which the detergent supply device cover is closed.

Hereinafter, the flow of the detergent after the detergent supply device 100 is mounted in the washing machine 1, that is, the housing 90 will be schematically described with reference to FIGS. 5 and 6. FIG. 5 is a cross-sectional view taken along line X-X' in FIG. 3 in a state in which the detergent supply device cover 15*e* is closed, and FIG. 6 is an enlarged view of a region A in FIG. 5.

Figure 6:
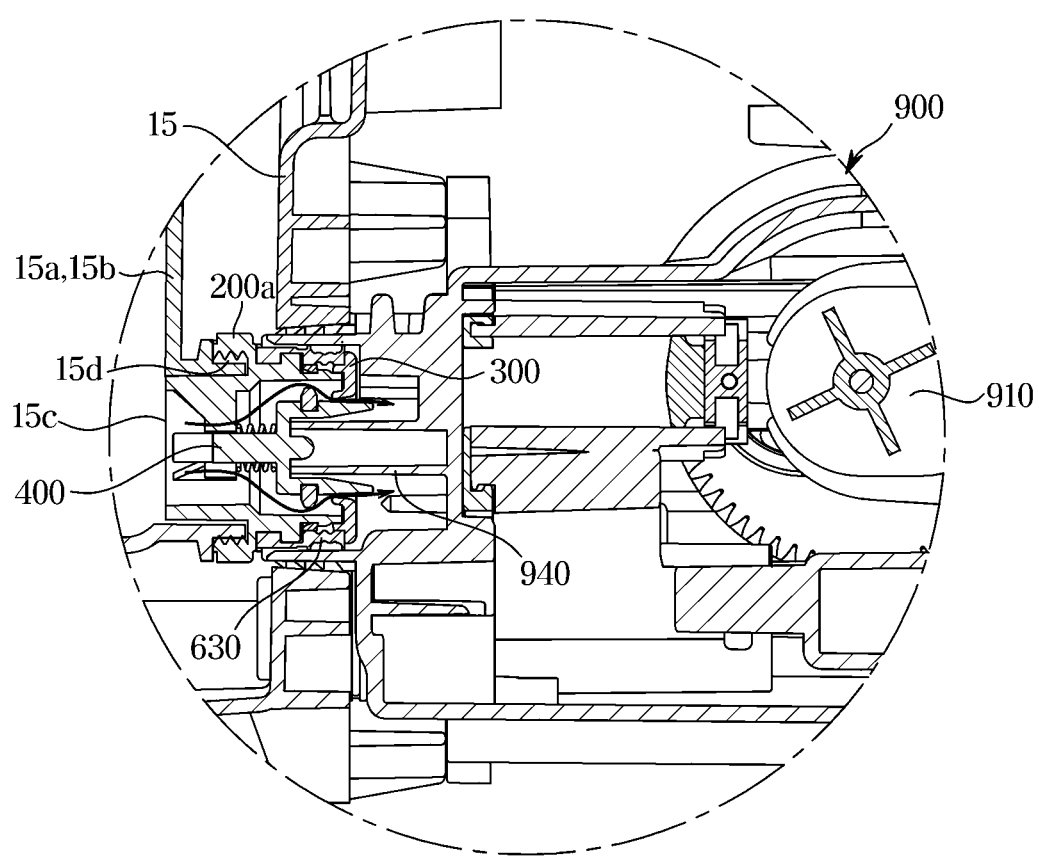
FIG. 6 is an enlarged view of a region A in FIG. 5.

Referring to FIG. 6, the detergent in the detergent containers 15*a* and 15*b* may flow into a valve housing 200 of the detergent flow check valve 110 through the detergent outlet 15*c* of the detergent containers 15*a* and 15*b*. The detergent containers 15*a* and 15*b* and the detergent supply device 100 may be combined with each other. Specifically, the male threads of the detergent outlet 15*c* of the detergent containers 15*a* and 15*b* and the female threads of the detergent container connection portion 15*d* may be combined by rotation. When combined by rotation, the detergent containers 15*a* and 15*b* and the detergent supply device 100 may be tightly connected by a second sub-sealing 620 (see FIG. 8). The second sub-sealing 620 may be formed of a material having elasticity such as silicone and rubber.

When the mounting of the detergent supply device 100 into the housing 90 is completed, the pressing part 940 provided on the seating part 930 of the detergent pump housing 920 may maintain a state of pressing the plunger 400 of the detergent flow check valve 110. That is, the plunger 400 may be maintained in a state of being pressed toward the detergent containers 15*a* and 15*b* located in the front, and a sealing 500 blocking an opening 700 (see FIG. 8) located between the detergent flow check valve 110 and the detergent pump unit 900 may be maintained in a state of being spaced apart from the opening 700 (see FIG. 8).

In this state, the detergent in the detergent containers 15*a* and 15*b* may flow to the detergent pump unit 900 by passing through the detergent outlet 15*c* of the detergent containers 15*a*, 15*b*, the valve housing 200 of the detergent flow check valve 110, and the opening 700 (see FIG. 8) in order. The detergent pump 910 may be operated according to the washing mode input by the user through the control panel 16. The detergent in the detergent supply device 100 may be introduced into the tub 20 by the operation of the detergent pump 910.

Figure 7:
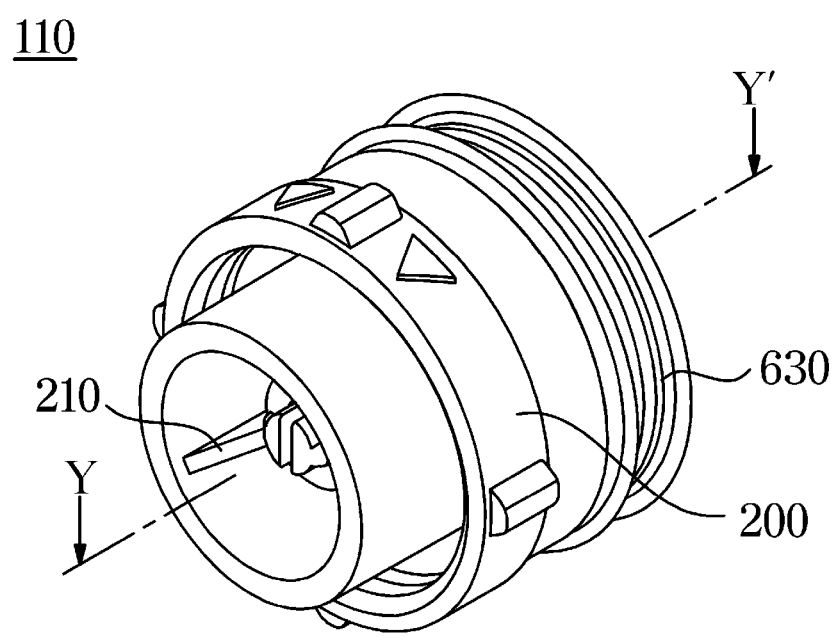
FIG. 7 is a perspective view of a detergent flow check valve according to an embodiment of the disclosure.
Figure 8:
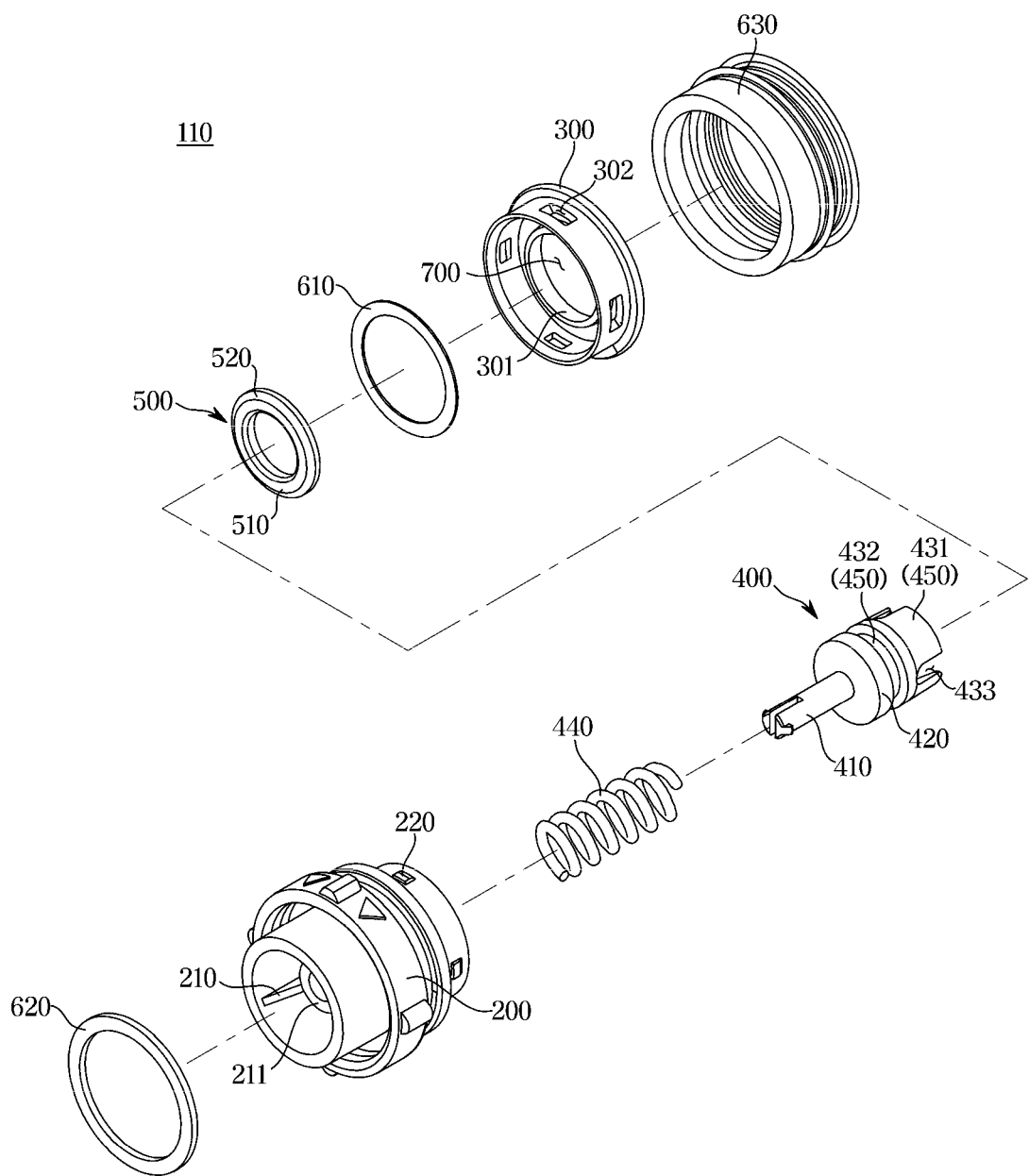
FIG. 8 is an exploded perspective view of the detergent flow check valve according to an embodiment of the disclosure.
Figure 9:
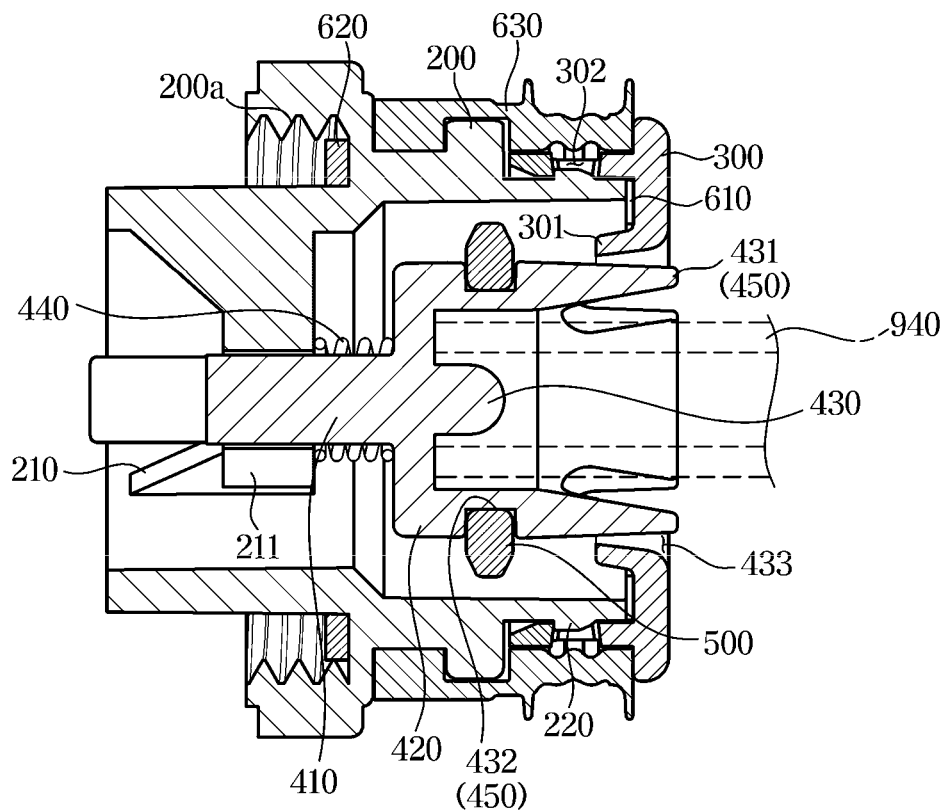
FIG. 9 is a cross-sectional view taken along line Y-Y' in FIG. 7 after mounting of the detergent supply device according to an embodiment of the disclosure is completed.
Figure 10:
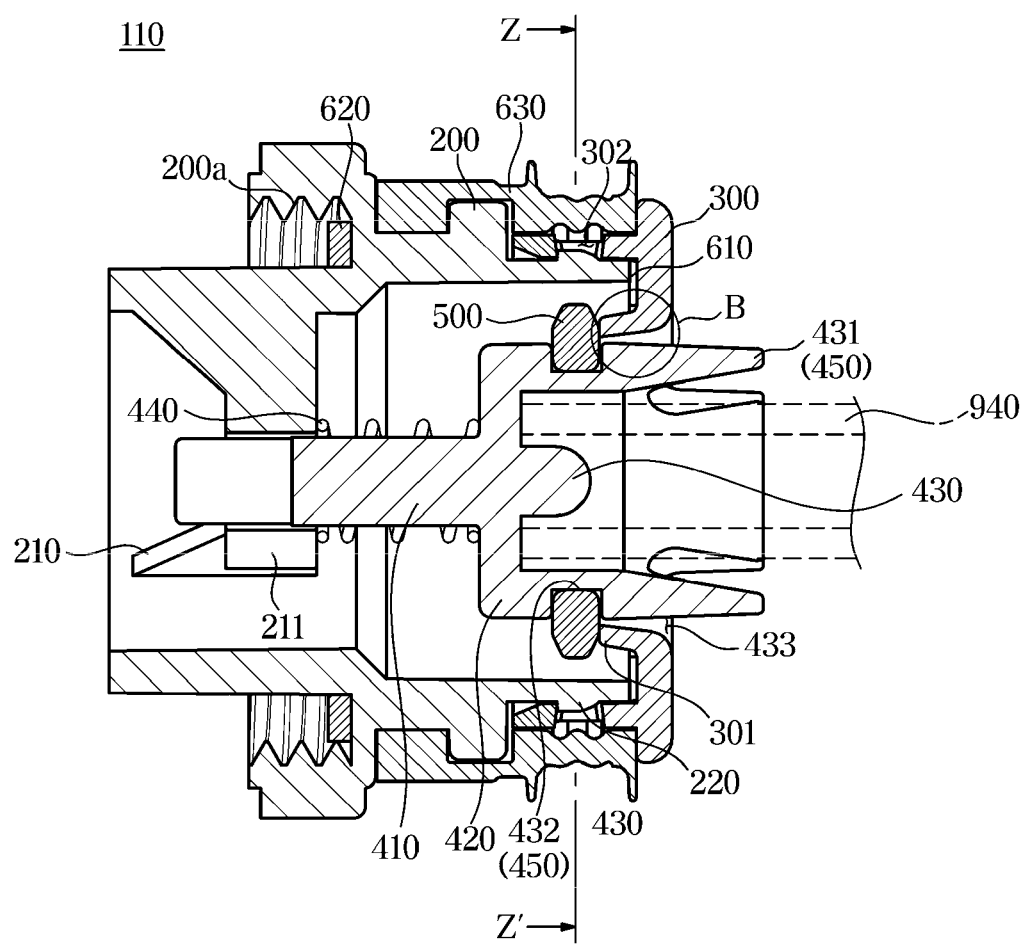
FIG. 10 is a cross-sectional view taken along line Y-Y' in FIG. 7 before the mounting of the detergent supply device according to an embodiment of the disclosure is completed.

Hereinafter, components of the detergent supply device 100 will be described with reference to FIGS. 7 to 10. FIG. 7 is a perspective view of the detergent flow check valve 100 according to an embodiment of the disclosure, FIG. 8 is an exploded perspective view of the detergent flow check valve 110 according to an embodiment of the disclosure, FIG. 9 is a cross-sectional view taken along line Y-Y' in FIG. 7 before mounting of the detergent supply device 100 according to an embodiment of the disclosure is completed, and FIG. 10 is a cross-sectional view taken along line Y-Y' in FIG. 7 after the mounting of the detergent supply device 100 according to an embodiment of the disclosure is completed. Reference numerals for the components in FIG. 10 that are the same as those in FIG. 9 are omitted.

The detergent flow check valve 110 of the detergent supply device 100 according to an embodiment of the disclosure may include the valve housing 200 and a valve housing cap 300. The valve housing 200 is configured to be in communication with the detergent containers 15*a* and 15*b*, and the valve housing cap 300 is coupled to the valve housing 200 and may have the opening 700. The opening 700 may be located between the valve housing 200 and the seating part 930 of the detergent pump housing 920.

The valve housing 200 and the valve housing cap 300 may be combined with each other. Specifically, as illustrated in FIG. 8, a hook 220 may be provided on the valve housing 200 and a fixing groove 302 may be provided on the valve housing cap 300. As the hook 220 is fastened to the fixing groove 302, the valve housing 200 and the valve housing cap 300 may be combined with each other. The hook 220 and the fixing groove 302 may be disposed opposite to the above. Unlike the above, the valve housing 200 and the valve housing cap 300 may be integrally formed.

When the valve housing 200 and the valve housing cap 300 are combined, a first sub-sealing 610 may be disposed between the two components. The valve housing 200 and the valve housing cap 300 may be hermetically combined by the first sub-sealing 610, so that the detergent does not leak between the valve housing 200 and the valve housing cap 300. The first sub-sealing 610 may be formed of a material having elasticity such as silicone and rubber. Alternatively, various materials capable of maintaining airtightness between the valve housing 200 and the valve housing cap 300 may be applied to the first sub-sealing 610.

Referring to FIGS. 8 and 9, the valve housing cap 300 may include a plunger guide 301 protruding from the opening 700 toward the inside of the valve housing 200. As the plunger guide 301 is provided, the process of mounting the detergent supply device 100 in the housing 90 may be stably performed, and the opening and closing operation of the plunger 400 in a state in which the detergent supply device 100 is mounted may be stably performed. The arrangement relationship and specific effects of the plunger guide 301 and the plunger 400 will be described later.

The detergent flow check valve 110 of the detergent supply device 100 may further include the plunger 400 disposed inside the valve housing 200 to pass through the opening 700. The plunger 400 may be guided by the valve housing cap 300.

Specifically, the plunger 400 may include a first slider 410 supported by the valve housing 200, the intermediate plate 420 combined with the first slider 410, and a second slider 450 extending from the intermediate plate 420 toward the opening 700.

Referring to FIG. 8, the first slider 410 of the plunger 400 may be provided in the form of a bar. A cross section of the bar may be circular as illustrated in FIG. 8. However, the cross section of the first slider 410 having a bar shape is not limited to a circular shape, and various shapes capable of effectively implementing a sliding structure may be adopted.

A diameter of the first slider 410 may be provided smaller than a diameter of the intermediate plate 420. By reducing the volume occupied by the first slider 410 in the valve housing 200, an effect of reducing the resistance of the first slider 410 to the detergent flowing in the valve housing 200 may be obtained.

In order for the first slider 410 to be supported by the valve housing 200, the valve housing 200 may include a valve housing rib 210 configured to support the first slider 410. The valve housing rib 210 may protrude from an inner side surface of the valve housing 200 toward the inside of the valve housing 200. The valve housing rib 210 may have a thin plate shape as illustrated in FIG. 8. The valve housing rib 210 may be configured such that an end of the valve housing rib 210 directly supports the first slider 410 formed in a bar shape. Or, as illustrated in FIG. 8, the valve housing rib 210 may support the cylinder 211 and the first slider 410 formed in a bar shape may be disposed to directly pass through the cylinder 211. By reducing the volume occupied by the valve housing rib 210 in the valve housing 200 through this structure, an effect of reducing the resistance of the valve housing rib 210 to the detergent flowing in the valve housing 200 may be obtained.

Referring to FIG. 8, the plunger 400 of the detergent supply device 100 includes an intermediate plate 420 combined with one end facing the opening 700 of the first slider 410 and the second slider 450 extending from the intermediate plate 420 toward the opening 700. The second slider 450 may extend from the intermediate plate 420 toward the opening 700 along a circumference of the intermediate plate 420. The intermediate plate 420 may be provided in the shape of a disk. When the intermediate plate 420 is provided in the shape of a disk, the second slider 450 may be provided in the shape of a cylinder. However, the intermediate plate 420 is not limited to the shape of the disk, and may be provided in various shapes as long as the plunger 400 and the sealing 500 may effectively open and close the opening 700.

Referring to FIGS. 8 and 9, a diameter of the second slider 450 may be provided smaller than a diameter of the opening 700. When the intermediate plate 420 is provided in the shape of a disk, the second slider 450 may be provided in the shape of a cylinder, and a diameter of the cylinder may be provided smaller than or equal to the diameter of the opening 700. The second slider 450 may include a flange 431 supported by the valve housing cap 300 and configured to slide along the valve housing cap 300 according to the movement of the plunger 400, and a sealing seating groove 432 provided between the intermediate plate 420 and the flange 431.

The second slider 450 of the plunger 400 may be configured such that the flange 431 protrudes from the opening 700, and the flange 431 may be configured to be always supported by the valve housing cap 300 even when the plunger 400 slides into the valve housing 200. By this structure, the process of mounting the detergent supply device 100 in the housing 90 may be stably performed, and the opening and closing operation of the plunger 400 in a state in which the detergent supply device 100 is mounted may be stably performed. Also, when the valve housing cap 300 is configured to include the plunger guide 301 protruding from the opening 700 toward the inside of the valve housing 200, a sliding section of the plunger 400 may be more stably secured, compared to a case where the plunger guide 301 is not provided.

Referring to FIGS. 8 and 9, a detergent flow groove 433 may be formed on the second slider 450 of the plunger 400 to guide the flow of detergent. Specifically, the detergent flow groove 433 may be provided on the flange 431 of the second slider 450. A plurality of the detergent flow grooves 433 may be provided on the flange 431 of the second slider 450.

The detergent flow check valve 110 of the detergent supply device 100 may further include a spring 440 surrounding the first slider 410 and disposed between the valve housing rib 210 and the intermediate plate 420. Specifically, one end of the spring 440 may be supported by the valve housing rib 210. Or, when the valve housing rib 210 supports the cylinder 211 and the first slider 410 formed in a bar shape is disposed to directly pass through the cylinder 211, one end of the spring 440 may be supported by the cylinder 211. The other end of the spring 440 may be supported by the intermediate plate 420. By this structure, the spring 440 may provide a restoring force so that the opening and closing operation of the plunger 400 may be performed in the valve housing 200 according to the mounting and separation of the detergent supply device 100.

The detergent flow check valve 110 of the detergent supply device 100 may further include a cover sealing 630 configured to surround the valve housing 200 and a connection portion between the valve housing 200 and the valve housing cap 300. When the detergent flow check valve 110 of the detergent supply device 100 is seated on the seating part 930 of the detergent pump housing 920, the cover sealing 630 maintains airtightness between the seating part 930 and the detergent flow check valve 110 to prevent the detergent from leaking while the washing machine 1 is operating.

Figure 11:
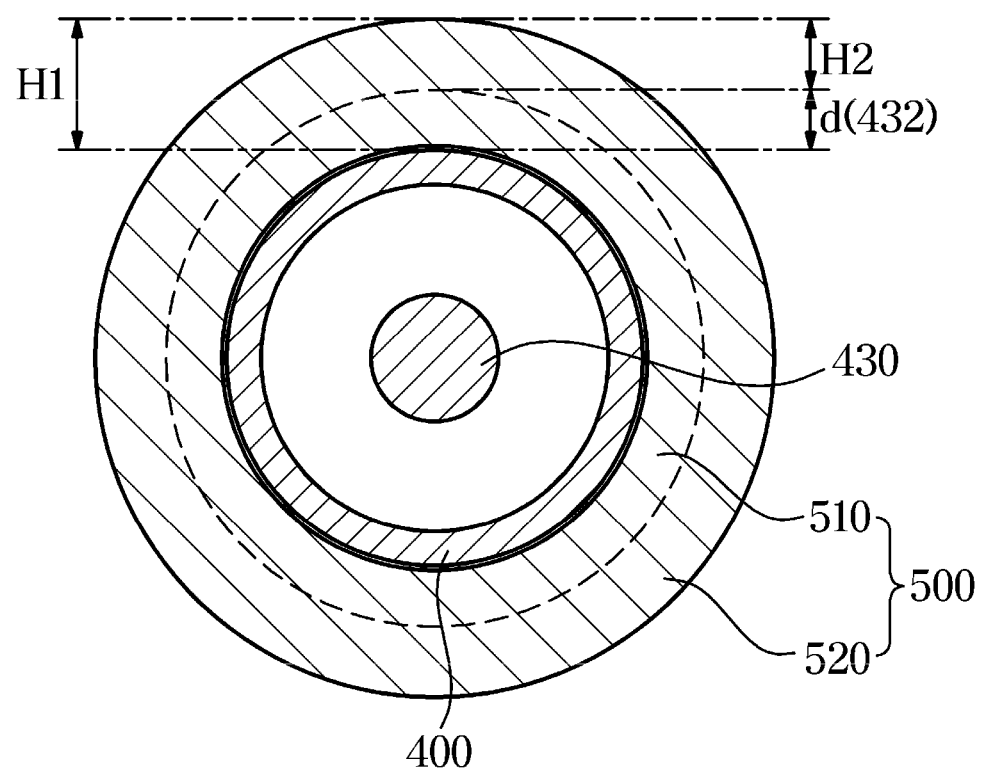
FIG. 11 is a cross-sectional view taken along line Z-Z' in FIG. 10.

Hereinafter, the arrangement relationship of the sealing 500 in the plunger 400 will be described in detail with reference to FIGS. 8 to 11. FIG. 11 is a cross-sectional view taken along line Z-Z' in FIG. 10.

Referring to FIGS. 8 to 10, the sealing 500 is configured to surround a circumference of the plunger 400 and may selectively open and close the opening 700 according to the movement of the plunger 400. Specifically, the sealing 500 may be seated in the sealing seating groove 432 of the plunger 400. The sealing mounting groove 432 may be provided between the intermediate plate 420 and the flange 431. That is, the sealing 500 may be positioned between the intermediate plate 420 and the flange 431 to selectively open and close the opening 700 according to the movement of the plunger 400.

In the case of a conventional detergent supply device, the sealing 500 is located inside the detergent containers 15a and 15b. Accordingly, when the detergent supply device 100 is separated from the washing machine 1, the detergent remaining in the valve housing 200 flows through the housing 90, the pump housing 90, and the like, so that the user needs periodic cleaning and the mounting and separation of the detergent supply device 100 may not be easy due to the detergent flowed down.

As the sealing 500 according to an embodiment of the disclosure is configured to surround the circumference of the plunger 400 that is disposed inside the valve housing 200 and passes through the opening 700, even when the detergent supply device 100 is separated from the washing machine 1, the amount in which the detergent remaining in the valve housing 200 flows down into the housing 90, the pump housing 90, and the like is very small, so that the disadvantages of the conventional detergent supply device described above may be solved.

Referring to FIGS. 8 and 10, the sealing 500 may be generally formed in a ring shape. The sealing 500 may include a first sealing portion 510 having a constant width and a second sealing portion 520 positioned outside the first sealing part 510 and having a width that gradually decreases as a distance from the center of the sealing 500 increases.

The first sealing portion 510 may be inserted into the sealing seating groove 432. As illustrated in FIG. 11, the sealing seating groove 432 has a depth d and may be formed along the circumference of the plunger 400, specifically, the second slider 450. The second sealing portion 520 is provided to surround the circumference of the plunger 400 without being inserted into the sealing seating groove 432, and may perform a function of selectively opening and closing the opening 700 according to the movement of the plunger 400.

The second sealing portion 520 may be formed in either a straight line or a curved line and may have a shape whose width gradually decreases as the distance from the center of the sealing 500 increases. Also, the second sealing portion 520 may be provided to be symmetrical. When provided in such a shape, there is an effect of reducing resistance by the sealing 500 when the detergent flows, compared to the case where the sealing 500 is simply formed with a constant width.

Referring to FIG. 11, the sealing 500 is configured such that a height of a portion in contact with the opening 700, that is, a height H2 of the second sealing portion 520 is in a ratio of 0.4 to 0.6 compared to a thickness H1 of the sealing 500 in a radial direction. In other words, the sealing 500 and the sealing seating groove 432 may be configured such that the ratio of H1 to H2 in FIG. 11 is 0.4 to 0.6. When the ratio of H1 to H2 is 0.6 or more, the sealing 500 may be easily separated from the sealing seating groove 432 so that the opening 700 may not be normally opened or closed. In addition, the separated sealing 500 may cause a malfunction of the detergent supply device 100. When the ratio of H1 to H2 is 0.4 or less, the opening 700 may not be opened or closed normally, so that when the detergent supply device 100 is separated, the detergent may flow out.

Hereinafter, the operation of the detergent supply device 100 will be described with reference to FIGS. 9 and 10.

Referring to FIG. 9, when the detergent supply device 100 is mounted on the housing 90 of the washing machine 1, the pressing part 940 provided on the seating part 930 of the detergent pump housing 920 may press the plunger 400 of the detergent flow check valve 110. Accordingly, the flange 431 of the second slider 450 of the plunger 400 may slide toward the detergent containers 15a and 15b located in front along the valve housing cap 300. When the mounting of the detergent supply device 100 into the housing 90 is completed, the pressing part 940 provided on the seating part 930 of the detergent pump housing 920 may maintain a state of pressing the plunger 400 of the detergent flow check valve 110. Specifically, the pressing part 940 may be combined with the pressing part guide 430 of the plunger 400 to press the intermediate plate 420. The plunger 400 may maintain a state of pressing the spring 440 disposed between the intermediate plate 420 and the valve housing rib 210. The plunger 400 may be maintained in a state of being pressed toward the detergent containers 15a and 15b located in the front. The sealing 500 blocking the opening 700 (see FIG. 8) located between the detergent flow check valve 110 and the inside of the detergent pump unit 900 may be maintained in a state of being spaced from the opening 700 (see FIG. 9). The flange 431 of the plunger 400 may be maintained in a state of being supported by the plunger guide 301 of the valve housing cap 300 even when the mounting of the detergent supply device 100 into the housing 90 is completed. That is, the flange 431 of the plunger 400 may be maintained in a section overlapping the plunger guide 301 of the valve housing cap 300.

In this state, the detergent in the detergent containers 15a and 15b may flow to the detergent pump unit 900 by passing through the detergent outlet 15c of the detergent containers 15a, 15b, the valve housing 200 of the detergent flow check valve 110, and the opening 700 (see FIG. 8) in order. The detergent pump 910 may be operated according to the washing mode input by the user through the control panel 16. The detergent in the detergent supply device 100 may be introduced into the tub 20 by the operation of the detergent pump 910.

Conversely, when the detergent supply device 100 is separated from the housing 90 of the washing machine 1, the above process is performed in reverse, and the sealing 500 blocks the opening 700 (see FIG. 10) located between the detergent flow check valve 110 and the inside of the detergent pump unit 900 again. The user may separate the detergent supply device 100 from the washing machine 1 without the detergent flowing down from the detergent supply device 100.

As is apparent from the above, in a detergent supply device of a washing machine according to an embodiment of the disclosure, through a structure in which a sealing is located inside a valve housing and is disposed in a sealing seating groove of a plunger and the shape of the sealing, deformation and separation of the sealing can be prevented, so that a liquid detergent can be supplied smoothly and a malfunction of the detergent supply device can be prevented.

Further, according to an embodiment of the disclosure, due to the sealing disposed adjacent to an opening, leakage of detergent from the detergent supply device can be effectively prevented when the detergent supply device is separated from the washing machine.

While the disclosure has been particularly described with reference to exemplary embodiments, it should be understood by those of skilled in the art that various changes in form and details may be made without departing from the spirit and scope of the disclosure.

What is claimed is:

1. A detergent supply device of a washing machine, the detergent supply device comprising:
   a valve housing that communicates with a detergent container;
   a valve housing cap coupled to the valve housing and having an opening;
   a movable plunger comprising:
      an intermediate plate inside the valve housing, the intermediate plate being perpendicular to a longitudinal direction of the valve housing and having a first side facing away from the opening and a second side facing toward from the opening,
      a first slider inside the valve housing and extending from the first side of the intermediate plate away from the opening,
      a second slider along a circumference of the second side and extending from the second side toward the opening so that a portion of the second slider is movable in the opening as the plunger moves, and
      a pressing guide part protruding from a center of the intermediate plate toward the opening; and
   a sealing surrounding a perimeter of the second slider to selectively open and close the opening according to the movement of the plunger.

2. The detergent supply device according to claim 1, wherein
   the valve housing cap further comprises a plunger guide protruding from the opening toward the inside of the valve housing.

3. The detergent supply device according to claim 1, wherein
   the first slider is supported by the valve housing as the plunger moves.

4. The detergent supply device according to claim 3, wherein
   the valve housing comprises a valve housing rib protruding from an inner surface of the valve housing toward the inside of the valve housing to support the first slider as the plunger moves.

5. The detergent supply device according to claim 4, wherein
   the first slider is formed in a bar shape to be supported by the valve housing rib, and
   a diameter of the first slider is smaller than a diameter of the intermediate plate.

6. The detergent supply device according to claim 5, further comprising
   a spring surrounding the first slider and disposed between the valve housing rib and the intermediate plate.

7. The detergent supply device according to claim 3, wherein
   a diameter of the second slider is smaller than a diameter of the opening, and
   the second slider comprises a flange supported by the valve housing cap and configured to slide along the valve housing cap according to the movement of the plunger, and a sealing seating groove between the intermediate plate and the flange in which the sealing is seated.

8. The detergent supply device according to claim 7, wherein
   the flange comprises a detergent flow groove to guide a flow of a detergent.

9. The detergent supply device according to claim 7, wherein
   the plunger is configured such that the flange protrudes from the valve housing cap, and the flange is configured to be continuously supported by the valve housing cap.

10. The detergent supply device according to claim 7, wherein
    the sealing is formed in a ring shape, and comprises a first sealing portion having a constant width and a second sealing portion positioned outside the first sealing portion and having a width gradually decreasing in a direction away from a center of the sealing.

11. The detergent supply device according to claim 10, wherein
    the second sealing portion is formed in either a straight line or a curved line.

12. The detergent supply device according to claim 11, wherein
    the second sealing portion is provided to be symmetrical.

13. The detergent supply device according to claim 10, wherein
    the first sealing portion is inserted into the sealing seating groove, and
    the sealing is configured such that a height of a portion in contact with the opening is in a ratio from approximately 0.4 to approximately 0.6 compared to a thickness of the sealing in a radial direction of the sealing.

14. The detergent supply device according to claim 3, wherein
    the plunger is configured such that the intermediate plate is pressable by a pressing part outside the detergent supply device.

15. The detergent supply device according to claim 1, further comprising
    a cover sealing surrounding the valve housing and a connection portion between the valve housing and the valve housing cap.

16. The detergent supply device according to claim 1, wherein:
    the valve housing cap includes a plunger guide forming the opening, and
    the plunger is supported by the plunger guide during a movement of the plunger.

17. The detergent supply device according to claim 16, wherein
    the plunger includes a flange extending from the intermediate plate toward the opening, protruding from the opening, and continuously supported by the plunger guide.

18. The detergent supply device according to claim claim 16, wherein
    the sealing is formed in a ring shape, and comprises a first sealing portion having a constant width and a second sealing portion positioned outside the first sealing portion and having a width gradually decreasing in a direction away from a center of the sealing.

19. The detergent supply device according to claim 18, wherein
    the second sealing portion is formed in either a straight line or a curved line, and
    the second sealing portion is provided to be symmetrical.

20. A detergent supply device that is mountable to a housing of a washing machine, the detergent supply device comprising:
    a valve housing that communicates with a detergent container;

a valve housing cap coupled to the valve housing and having an opening;

a plunger comprising a first slider inside the valve housing and supported by the value housing, an intermediate plate inside the valve housing and combined with the first slider, a second slider along a circumference of the intermediate plate and extending from the intermediate plate into the opening, and a pressing guide part protruding from a center of the intermediate plate toward the opening, so that, when the detergent supply device is being mounted to the housing of the washing machine, a pressing part of a detergent pump unit of the washing machine presses the intermediate plate while the pressing guide part is surrounded by the pressing part, to thereby move the plunger inside the valve housing with the second slider moving in the opening and the movement of the plunger being guided by the valve housing cap; and a sealing surrounding a circumference of the plunger and configured to selectively open and close the opening according to the movement of the plunger.

\* \* \* \* \*